United States Patent [19]

Nakajima

[11] Patent Number: 5,342,160
[45] Date of Patent: Aug. 30, 1994

[54] OPENER FOR IRRADIATION CAPSULE

[75] Inventor: Shigeji Nakajima, Ibaraki, Japan

[73] Assignee: Nakajima Seisakusho Co., Ltd., Ibaraki, Japan

[21] Appl. No.: 978,153

[22] Filed: Nov. 17, 1992

[30] Foreign Application Priority Data

Nov. 19, 1991 [JP] Japan .................. 3-303544

[51] Int. Cl.$^5$ .................................................. B23B 3/00
[52] U.S. Cl. ........................................ 414/412; 83/930; 82/67; 82/72
[58] Field of Search ............ 414/412; 53/482, 381.2; 83/930; 82/56, 59, 67, 70.2, 72

[56] References Cited

U.S. PATENT DOCUMENTS

| | | | |
|---|---|---|---|
| 723,358 | 3/1903 | Bradford | 82/67 |
| 1,159,828 | 11/1915 | Carnes | 82/67 |
| 1,806,475 | 5/1931 | Lee | 53/381.2 X |
| 3,085,327 | 4/1963 | Douis | 82/67 X |
| 3,379,080 | 4/1968 | Massa | 82/72 X |
| 3,613,489 | 10/1971 | Randich | 82/70.2 |

*Primary Examiner*—Michael S. Huppert
*Assistant Examiner*—James T. Eller, Jr.
*Attorney, Agent, or Firm*—Tarolli, Sundheim & Covell

[57] ABSTRACT

An opener according to the invention comprises a vertical displacement mechanism for moving a capsule to a position in which the capsule is to be opened. The opener also includes a holding mechanism for holding the capsule, a cutting mechanism for cutting the capsule, and a casing. The cutting mechanism includes three roller cutters rotatably supported by a cutter holder by means of a pin. Each of the roller cutters is disposed so as to be rotated around the capsule and to be movable radially of the capsule for the purpose of cutting the capsule. The capsule, vertical displacement mechanism, holding mechanism and cutting mechanism are all contained in the casing and are actuated by a manipulator within the lead cell.

1 Claim, 5 Drawing Sheets

OPENER FOR IRRADIATION CAPSULE

BACKGROUND OF THE INVENTION

1. Field of the Invention

This invention generally relates to an opener for irradiation capsules in which samples for irradiation are sealingly contained. More particularly, the invention relates to an opener which functions to open such capsules after irradiation of radiation.

2. Description of the Prior Art

In a nuclear reactor, irradiation of radiation onto a sample is usually conducted, with the sample sealingly or shieldingly enclosed within capsules of metal or synthetic resin material. After irradiation, such a capsule is opened so as to take the sample out of the capsule. The capsule, however, should not be touched directly by an operator, since radiation has been irradiated to the capsule. Accordingly, it is necessary for the operator to put the radiation contaminated capsule in a lead cell for the purpose of radiation shielding. Thereafter, the operator may open the capsule by remotely controlling a capsule opener by means of a manipulator so as to remove the sample from the capsule using a tool such as a tong.

Conventionally, openers for irradiation capsules are known in the art. An example of such openers is shown in FIG. 6. The illustrated opener includes drive rollers 100, 110 adapted to be rotated in the same direction so as to rotatively drive a capsule A, a lever 130 for pivotal movement around a pin 120, a roller cutter 140 attached to one of the longitudinal ends of the lever 130, a cam member 50 disposed adjacent to the longitudinal other end of the level 130 for actuating the lever 130 to cause the roller cutter 140 to force against the capsule A, and a motor (not shown) for rotatively driving the drive rollers 100, 110 and cam member 150. Reference numeral 160 in FIG. 6 indicates a cam follower attached to the longitudinal other end of the lever 130.

When it is intended to open the capsule A, the capsule is first clamped between the drive rollers 100, 110 and the roller cutter 140 and then the motor is energized. By this, the drive rollers 100, 110, as well as the cam 150, is rotated in the direction indicated by arrow in FIG. 6. Thus, the longitudinal other end of the lever 130 is pushed away by means of the cam 150, while, at the same time, the longitudinal one end of the lever is pivotally driven so as to approach the capsule A. Accordingly, the roller cutter 140 causes the capsule A to force against the drive rollers 100, 110 so as to be rotated by the drive rollers 100, 110, whereby the roller cutter 140 penetrates into the capsule A so as to open the capsule A.

It is true that the above opener may actuate to securely cut or sever the capsule A in the initial stage of cutting or opening of the capsule. In the final stage of cutting, however, the force acting on the capsule A so as to urge the capsule against the drive rollers 100, 110 tends to become insufficient to rotate the capsule A. Thus, there would be possibility in that the capsule A would not be cut or opened completely.

Further, it is possible for the sample enclosed within the capsule A to be damaged due to vibration caused from rotation of capsule A, when the sample is fragile or brittle in nature.

Furthermore, it is difficult to increase displacement or movable distance of the roller cutter 140 due to the use of the cam member 150. This restricts application of a particular opener to capsules having a diameter within a specific range. Thus, it is not contemplated for conventional opener to have flexibility or universality.

SUMMARY OF THE INVENTION

Accordingly, it is a main object to provide an opener for irradiation capsules which is able to completely or fully open a capsule, which does not give or apply any vibrations to the capsule, and which may open capsules regardless of their sizes.

In order to achieve the above object, the present invention provides an opener for a capsule to be irradiated. The opener comprises a holding mechanism for holding the capsule during cutting thereof, a cutting mechanism including a plurality of roller cutters rotatably mounted on a cutter holder, the roller cutter being adapted to be rotated around the capsule about a central axis of the capsule and to be displaceable radially of the capsule for cutting the capsule, and a casing containing therein the capsule, the holding mechanism and the cutting mechanism.

The holding mechanism includes a pair of clamp members symmetrically disposed around the capsule and supported for movement toward and from one another so as to clamp the capsule therebetween.

Biasing members urge the respective clamp members against the capsule.

A resilient member is disposed between the clamp member and the biasing member.

A drive mechanism displaces the biasing members.

A switch means de-energizes a drive source of the drive mechanism when the clamp members compress each resilient member to approach to the respective biasing members beyond a predetermined distance therebetween. The cutting mechanism includes two gears supported for rotation about the central axis of the capsule at speeds slightly different with each other and a drive mechanism for rotatively driving the two gears.

A plurality of support members are carried by one of the two gears which has number of teeth less than that of the other gear and substantially equally spaced apart from one another in the circumferential direction of the one gear. The support members carry the cutter holder for the cutter roller so as to be displaceable radially of the capsule.

A drive gear is disposed on the other gear having number of teeth larger than that of said one gear.

A radial displacement mechanism includes a driven gear meshed with said drive gear. The radial displacement mechanism is adapted to translate a rotational movement from the driven gear into a linear movement so as to displace the cutter holder radially of the capsule.

In accordance with the invention, and when the drive mechanism for the capsule cutting mechanism is actuated, with the capsule being securely held by the pair of clamp members which receive a resilient force from by resilient members, the two gears are rotated. By this, the plural roller cutters are rotated along the periphery of the capsule about the central axis of the capsule by means of one of the gears. Simultaneously, the plural roller cutters are also driven by the other of the gears radially of the capsule so as to cut or open the capsule.

BRIEF DESCRIPTION OF THE DRAWINGS

For a better understanding of the invention, and to show how the same may be carried into effect, reference will now be made, by way of example, to the accompanying drawings in which like reference numerals refer to like elements.

DETAILED DESCRIPTION OF PREFERRED EMBODIMENTS

Figure 1:
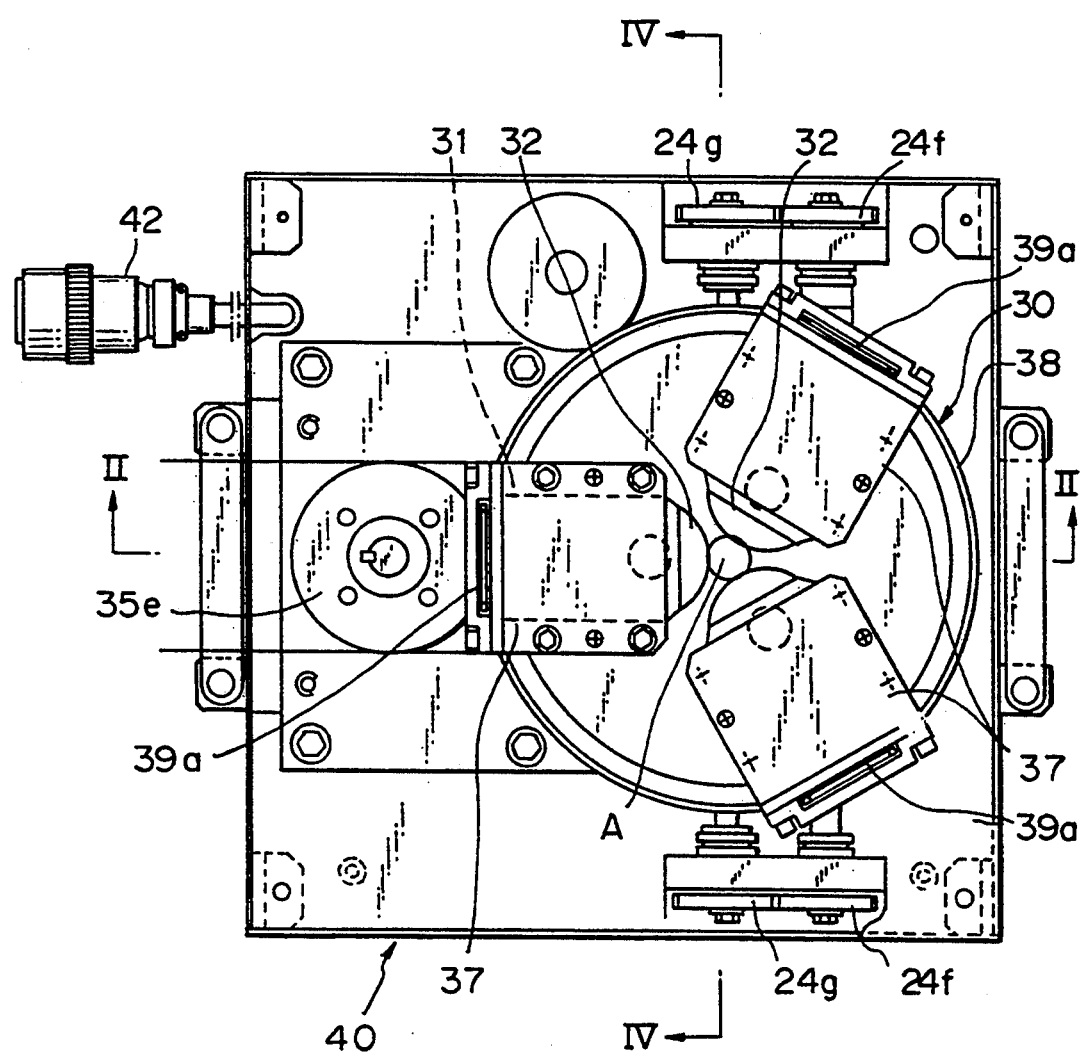
FIG. 1 is a plan view of an opener according to the invention, with the omission of a top plate thereof.

One embodiment of the invention will be explained hereinbelow with reference to FIGS. 1 through 5.

An opener according to one embodiment of the invention includes, as shown in FIGS. 1, 2, 4 and 5, a vertical displacement or elevating mechanism 10, a holding mechanism 20, a cutting mechanism 30 and a casing 40. The vertical displacement mechanism 10 is adapted to move an irradiation capsule A to a position in which it is to be opened. The holding mechanism 20 is adapted to hold the irradiation capsule A in a fixed position. The cutting mechanism 30 includes three roller cutters 32 mounted on a cutter holder 31 via a pin 31a for rotatable movement. The roller cutters 32 are adapted to rotate around the capsule A about a central axis of the capsule as a rotational center thereof. The roller cutters 32, while rotating around the capsule A, are moved radially of the capsule so as to cut the capsule. The capsule A, capsule vertical displacement mechanism 10, capsule holding mechanism 20 and capsule cutting mechanism 30 are all housed within the casing 40 and adapted to be actuated by means of a manipulator in the lead cell.

Figure 4:
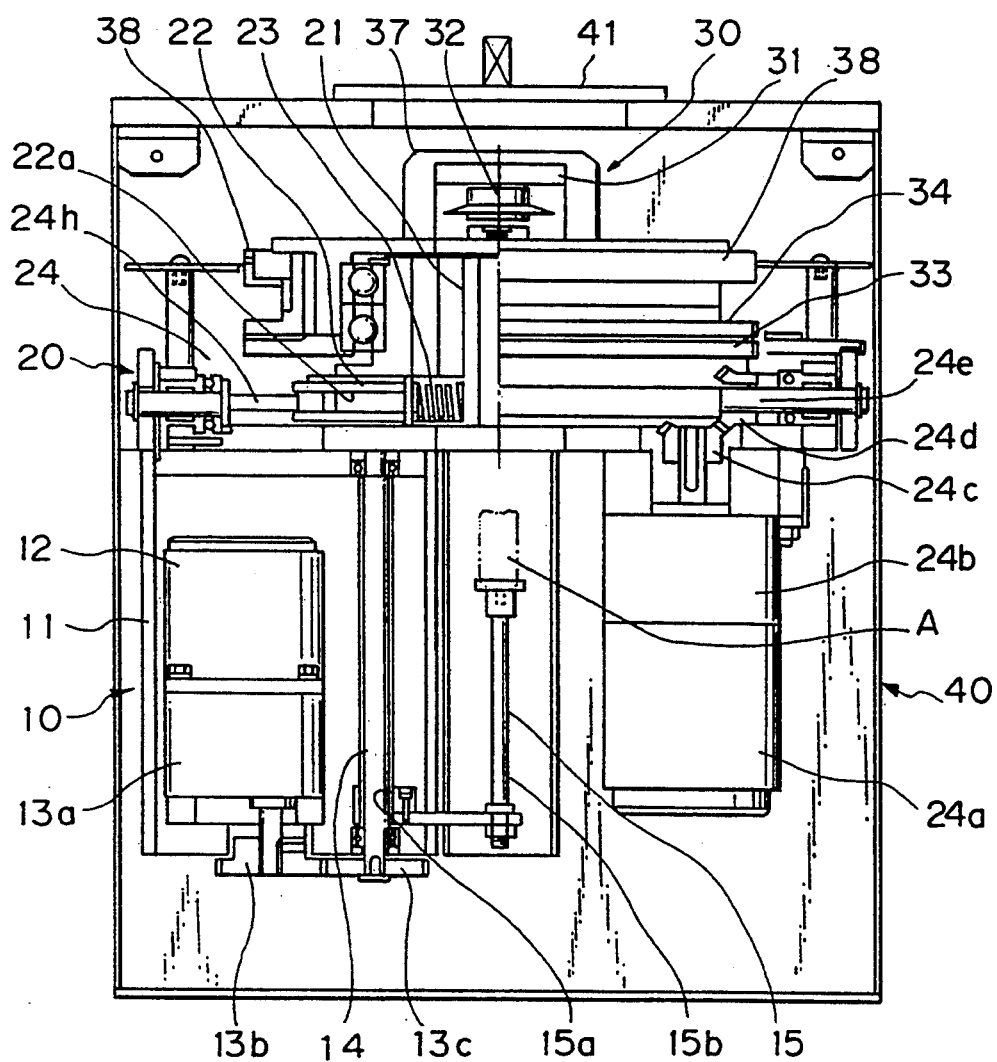
FIG. 4 is a sectional view taken along line IV—IV in FIG. 1

The vertical displacement mechanism 10 includes, as shown in FIG. 4, a frame 11 disposed below the holding mechanism 20, a motor 12 within the frame 11, a screw shaft 14 extending vertically in the frame 11 and a displacement member 15 adapted for vertical movement along the screw shaft 14. The screw shaft 14 is rotatably driven by the motor 12 via a gear head (reduction gear mechanism) 13a, and gears 13b, 13c. The displacement member 15 includes a portion having a threaded hole 15a, and a support portion 15b for supporting the capsule A. The vertical speed of the vertical displacement mechanism 10 may be set, for example, at 100 mm/minute. The vertical stroke of the vertical displacement mechanism may be up to 130 mm.

Figure 5:
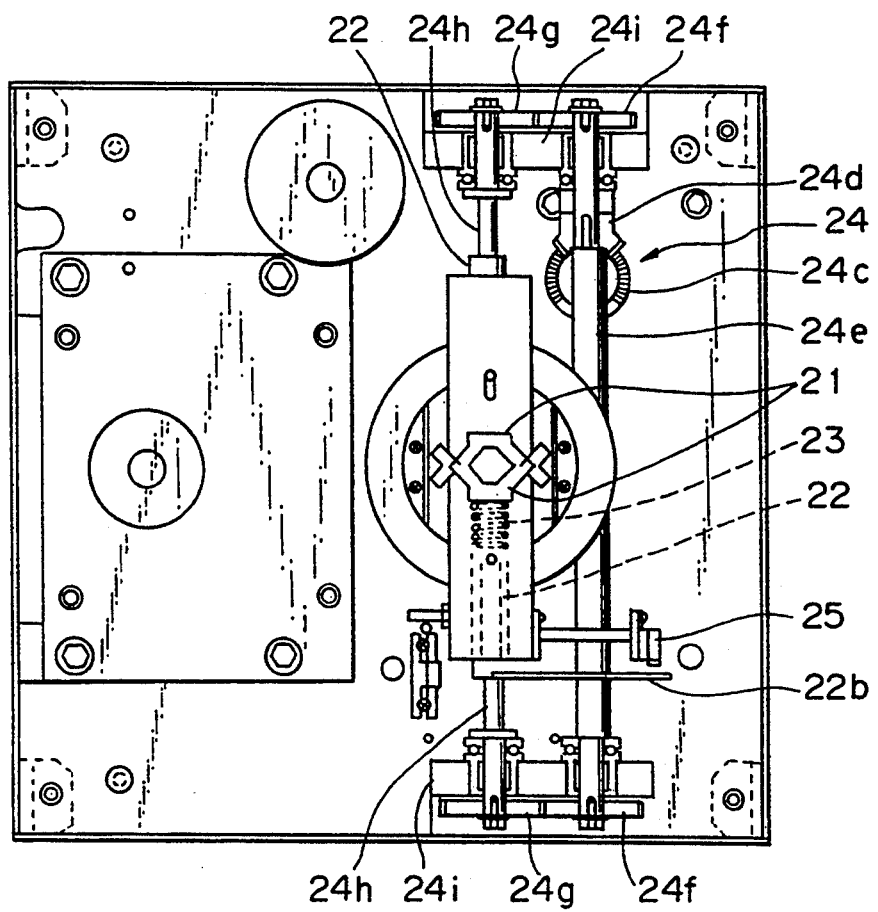
FIG. 5 is a plan view illustrating a mechanism for holding a capsule in a fixed position.
Figure 6:
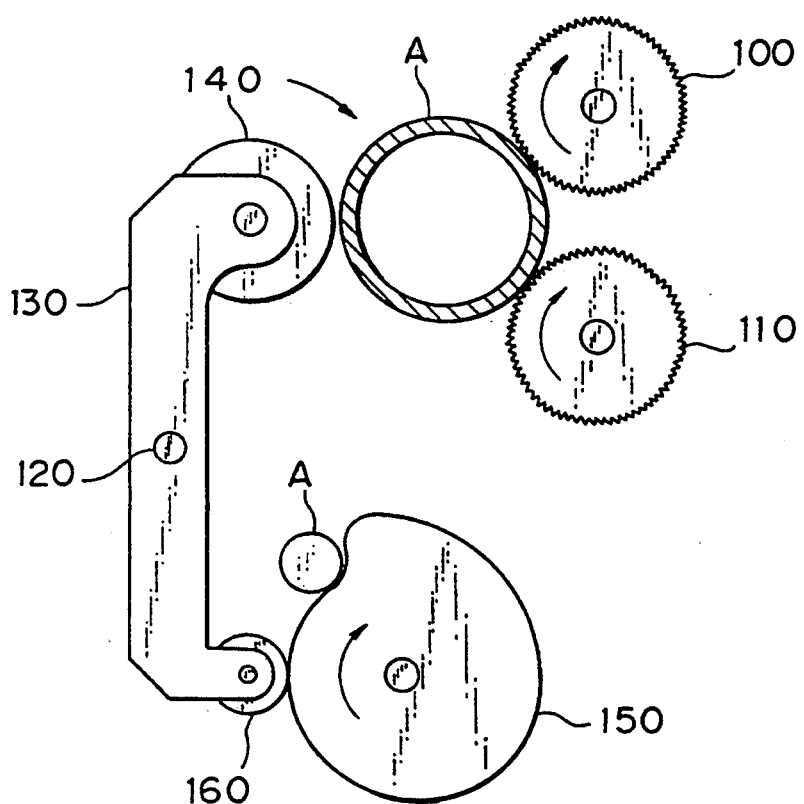
FIG. 6 is a schematic illustration of a prior art opener.

The holding mechanism 20 includes, as shown in FIGS. 4 and 5, a clamp having a pair of clamp members 21, 21, biasing members 22, 22 for urging the clamp members 21, 21, respectively, toward the capsule A, coil springs 23, 23 disposed between the respective clamp members and biasing members, a drive mechanism 24 for actuating the biasing members 22, 22, and a limit switch 25. The pair of clamp members 21, 21 are disposed on either side of the capsule in a symmetrical manner for movement toward and apart from one another so as to releasably clamp the capsule A. The limit switch 25 serves as a switch means for de-energizing a motor 24a, constituting a driving source for the drive mechanism, when, due to the compression of the coil spring 23, a distance between the clamp member 21 and biasing member becomes smaller than a predetermined value.

The drive mechanism 24 is constituted by the motor 24a, a drive shaft 24e extending substantially parallel with the pair of clamp members 21, 21, and a pair of threaded shaft 24h for supporting the clamp. The drive shaft 24 is rotatably driven by the motor 24a via a gear head 24b, bevel gears 24c, 24d. Each threaded screw 24h is threadingly engaged with the screw hole 22a in the biasing member 22 and rotatably driven by the drive shaft 24e via a gear 24f, 24g.

The threaded shafts 24h for supporting the clamp are carried by respective bearing members 24i of the drive shaft 24e for rotatable movement. The threaded shafts 24h, however, are prevented from moving in the axial direction. The threaded shafts 24h and the screw hole 22a cooperatingly constitute a mechanism for converting a rotational movement into a linear movement. Thus, rotation of each of the threaded shafts 24h causes the biasing member 22 to be displaced in the axial direction.

60 mm/minute of displacement velocity is selected for each clamp member 21. The holding mechanism 20 is capable of grasping or holding capsules having a diameter from about 14 mm to about 40 mm.

The biasing member 22 is provided with a limit rod 22b for actuating the limit switch 25.

Figure 2:
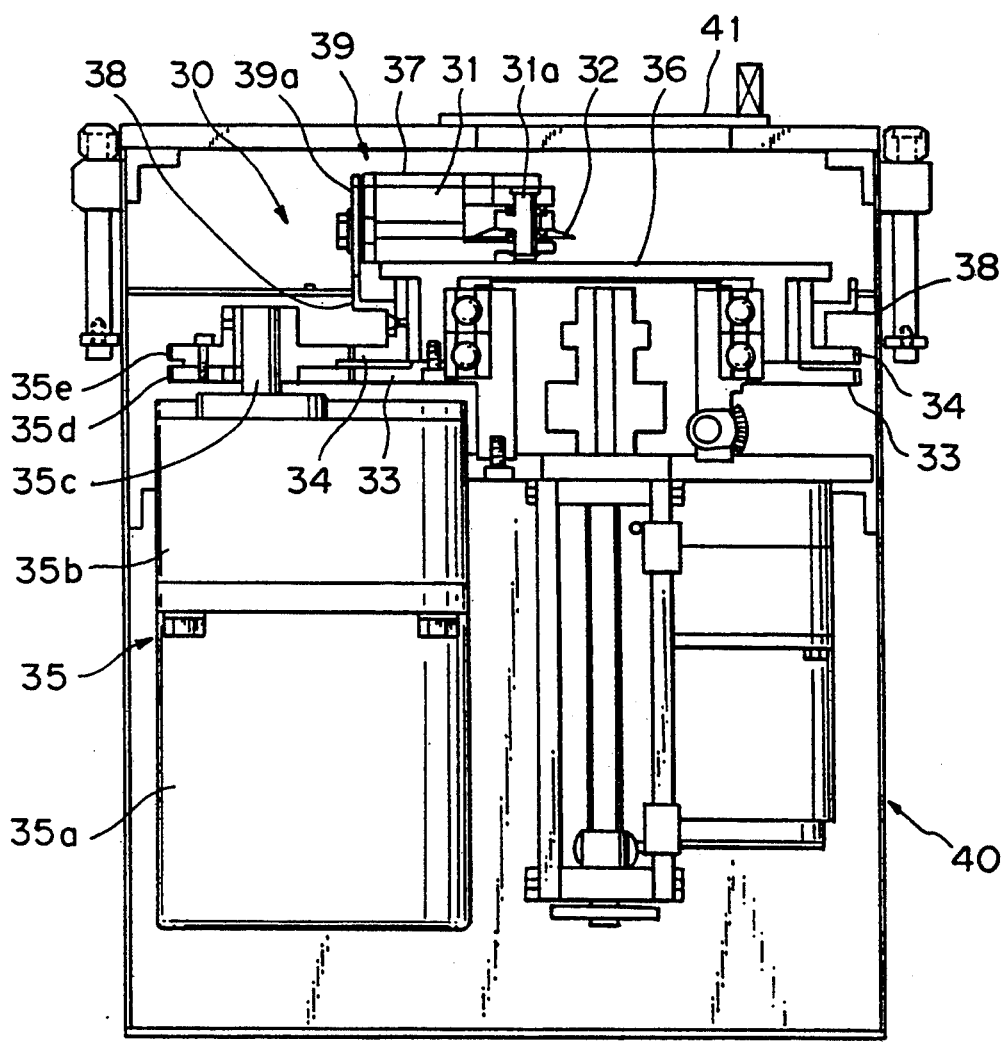
FIG. 2 is a sectional view taken along line II—II in FIG. 1.
Figure 3:
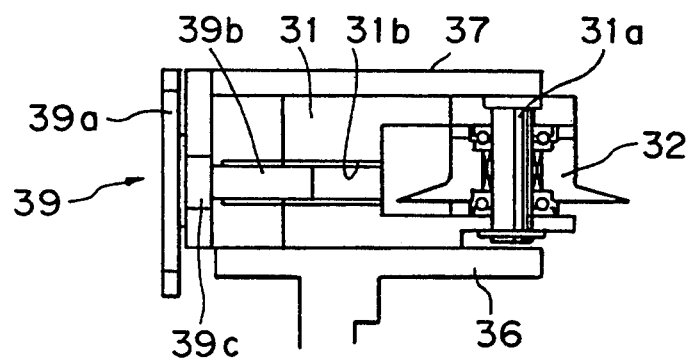
FIG. 3 is an enlarged sectional view illustrating a portion of a roller cutter and cutter holder.

The capsule cutting mechanism 30 includes, as shown in FIGS. 1, 2 and 3, two gears 33, 34, a drive mechanism 35 for rotatively driving the gears 33, 34, a turn table 36, three support members 37 on the turn table 36, a drive gear 38, and a radial displacement mechanism 39.

The gears 33, 34 are supported for rotation about the central axis of the capsule A. Circumferential or peripheral velocities for the gears 33, 34 are slightly different from one another.

The turn table 36 is secured to the gear 33 having a number of teeth less than that of gear 34.

The support members 37 are carried by the turn table 36 so that they are spaced apart from one another 120 degrees in the circumferential direction of the gear 33. The cutter holder 31 is carried by the support members 37 so as to be displaceable radially of the capsule.

The drive gear 38 is mounted on the gear 34 which, as mentioned above, has a number of teeth larger than that of the gear 33.

The radial displacement mechanism 39 includes a driven gear 39a meshed with the drive gear 38. The radial displacement mechanism 39 converts a rotational movement from the driven gear 39a into a linear movement so as to displace the cutter holder 31 radially of the capsule A.

The drive mechanism 35 includes a motor 35a, a gear head 35b, and two gears 35d, 35e secured to a drive shaft 35c of the gear head 35b. The gear 35d is meshed with the gear 33, while the gear 35e is meshed with the gear 34.

The radial displacement mechanism 39 includes a driven gear 39a and a feed screw 39c. The feed screw 39c includes a threaded portion which is connected with the driven gear 39a at one axial end thereof and threadingly received by the screw hole 31b in the cutter holder 31 at the other axial end thereof. The radial displacement mechanism 39 functions to move the cutter holder 31 radially of the capsule A at a low speed, making use of the difference in rotational number between the gears 33 and 34.

Rotational number of the turn table 36 is set, for example at 108 RPM, while displacement velocity or speed of the roller cutter 32 is set, for example at 2.7 mm/minute. The roller cutter 32 may advance or move forwardly, for example 0.025 mm during a single turn or rotation of the turn table 36.

The casing 40 includes a top plate 41 which includes a openable cover 42 for allowing the capsule A inserted into or removed from the casing 40. The casing is so configured that a relay connector 42 electrically connected to a control panel may be attached thereto.

Operation of the opener of the invention will be explained below.

A manipulator is actuated in a manner whereby the capsule A is inserted into the casing 40 and positioned on the support portion 15b of the vertical displacement mechanism 10.

Upon actuation of the opener, the motor 12 for the vertical displacement mechanism 10 is first energized, so that the capsule A is moved upwardly to a position in which a portion of the capsule A to be cut is aligned with the level of the roller cutter 32.

Then, the motor 24a for the holding mechanism 20 is energized, so that the clamp members 21 are displaced toward one another by the respective biasing members 22 through the spring 23. By this, the capsule A becomes clamped or securely held between the clamp members 21. In this connection, it is noted that the motor 24a continues to be activated, until the limit rod 22b engages with the limit switch 25. In this manner, the capsule A is securely clamped between the clamp members 21 which receive resilient biasing force from the spring 23.

Next, the motor 35a for the cutting mechanism 30 is energized, so that the gears 33, 34 are rotated. This causes rotation of the turn table 36 and drive gear 38. By this, the roller cutter 32 is rotated around the capsule A so as to penetrate into the capsule.

The capsule A is cut or opened as mentioned above. Accordingly, it will be apparent that the opener is able to cut or open the capsule completely, without remaining any uncut portion.

The capsule A, during cutting thereof, may be securely held by the clamp members 21. Thus, the capsule can be prevented from rocking or moving due to vibration applied thereto. This contributes to prevent the sample contained in the capsule from damaged.

The holding mechanism may be applied to a various size of capsules by simply changing position of the limit rod 22b, thus representing generality or universality.

The capsule A, vertical displacement mechanism 10, holding mechanism 30 and cutting mechanism 30 are all contained in the casing 40 which is made of lead. This construction prevents any leakage of radioactivity from the casing, while also preventing any dusts or foreign materials, which may cause possible failure of the opener, entering into the casing.

As stated above, and in accordance with the present invention, there is provided an opener which is able to fully open a capsule, which does not give any vibrations to the capsule, and which is capable of opening capsules of various sizes.

The invention has been described with reference to a preferred embodiment. However, it will be appreciated that variations and modifications can be effected within the ordinary skill in the art without departing from the spirits and scope of the invention.

What is claimed is:

1. An opener for a capsule to be irradiated comprising:

a holding mechanism for holding the capsule during cutting thereof;

a cutting mechanism including a plurality of roller cutter rotatably mounted on a cutter holder, said roller cutter being rotated around the capsule about a central axis of the capsule and displaceable radially of the capsule for cutting the capsule; and a casing containing therein said capsule, said holding mechanism and said cutting mechanism;

said holding mechanism including:

a pair of clamp members symmetrically disposed around said capsule and supported for movement toward and from one another so as to clamp said capsule therebetween;

biasing members for urging the respective clamp members against said capsule;

a resilient member disposed between said clamp member and said biasing member;

a biasing member drive mechanism for displacing said biasing members;

and a switch means for de-energizing a drive source of said drive mechanism when said resilient member is compressed to narrow beyond a predetermined distance between said clamp member and said biasing member;

said cutting mechanism including:

a first gear and a second gear supported for rotation about the central axis of said capsule at speeds slightly different with each other;

a gear drive mechanism for rotatively driving said two gears;

a plurality of support members carried by one of the two gears which has number of teeth less than that of the other gear and substantially equally spaced apart from one another in the circumferential direction of said one gear, said support members carrying said cutter holder for said cutter roller so as to be displaceable radially of said capsule;

a drive gear disposed on said other gear having number of teeth larger than that of said one gear; and a radial displacement mechanism including a driven gear meshed with said drive gear, said radial displacement mechanism adapted to translate a rotational movement from said driven gear into a linear movement so as to displace said cutter holder radially of said capsule.

* * * * *